(12) United States Patent
You et al.

(10) Patent No.: US 8,724,996 B2
(45) Date of Patent: May 13, 2014

(54) TRANSMISSION APPARATUS AND TRANSMISSION METHOD FOR SUBSCRIBER NETWORK IN CABLE NETWORK

(75) Inventors: Woongshik You, Gyeryong-si (KR); Dong Joon Choi, Daejeon-si (KR); Young Kwon Hahm, Daejeon-si (KR); Soo In Lee, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 287 days.

(21) Appl. No.: 13/275,349

(22) Filed: Oct. 18, 2011

(65) Prior Publication Data

US 2012/0155878 A1 Jun. 21, 2012

(30) Foreign Application Priority Data

Dec. 17, 2010 (KR) .......................... 10-2010-0130202

(51) Int. Cl.
*H04J 14/02* (2006.01)
*H04B 10/25* (2013.01)

(52) U.S. Cl.
USPC .............................. 398/72; 398/67; 398/115

(58) Field of Classification Search
USPC ........................................ 398/67, 68, 72, 115
See application file for complete search history.

(56) References Cited

U.S. PATENT DOCUMENTS

| 2002/0136203 A1* | 9/2002 | Liva et al. ..................... 370/352 |
| 2003/0028897 A1* | 2/2003 | Brooks ......................... 725/129 |
| 2007/0136743 A1* | 6/2007 | Hasek et al. .................... 725/33 |
| 2009/0248828 A1* | 10/2009 | Gould et al. .................. 709/207 |
| 2010/0239251 A1* | 9/2010 | Biegert et al. ................... 398/58 |

FOREIGN PATENT DOCUMENTS

KR  2007-0025771 A  3/2007

* cited by examiner

*Primary Examiner* — Nathan Curs
(74) *Attorney, Agent, or Firm* — Rabin & Berdo, P.C.

(57) ABSTRACT

Provided are a transmission apparatus and a transmission method for a subscriber network in a cable network. A passive optical network (GPON) receiver receives data packets through a fiber line using a plurality of optical wavelengths from a head end. A micro cable modem termination system (CMTS) converts the data packets into a data over cable service interface specification (DOCSIS)-based DOCSIS frame and transmits the DOCSIS frame to at least one subscriber device through a coaxial line.

8 Claims, 3 Drawing Sheets

TRANSMISSION APPARATUS AND TRANSMISSION METHOD FOR SUBSCRIBER NETWORK IN CABLE NETWORK

CROSS-REFERENCE TO RELATED APPLICATIONS

This Application claims the benefit of priority of Korean Patent Application No. 10-2010-0130202 filed on Dec. 17, 2010, all of which is incorporated by reference in its entirety herein.

BACKGROUND OF THE INVENTION

1. Field of the Invention

The present invention relates to a cable network, and more particularly, to a transmission apparatus and a transmission method for a subscriber network in a cable network and a transmission system using the same.

2. Related Art

Data over cable service interface specification (DOCSIS) defines a standard interface protocol for a cable modem. Recently, an advanced DOCSIS standard provides channel bonding, multicasting support function enhancement, or the like, for large-capacity, high-quality data transmission. With the progress of converging broadcasting and communication using Internet Protocol (IP)-based transmission, the DOCSIS standard has become an infrastructure capable of receiving multimedia transmission services by converging broadcasting and communication in a standard for a cable network.

In a hybrid fiber-coaxial (HFC) network, digital broadcasting services and communication services have been provided through separate channels by using separate devices. The digital broadcasting services are modulated into RF signals in a quadrature amplitude modulation (QAM) scheme by using a moving picture expert group 2-transport stream (MPEG2-TS)-based broadcasting stream and are then transmitted by using a broadcasting frequency. The communication services are provided by using a DOCSIS protocol between a CMTS positioned at a head end and subscriber devices.

Recently, the boundaries between the broadcasting services and the communication services are gradually becoming indistinct. Further, the digital broadcasting services using the HFC network will gradually be developed from a type using the existing MPEG-2 TS to a type using internet protocol packets.

In the HFC network, a set of subscriber devices receiving the same transmission signals is referred to as a cell. Generally, several hundred to several thousand subscriber devices are disposed in a single cell. However, in order to improve service quality and transmission rate per subscriber, the cell has been developed into a micro cell type that includes several tens of subscriber devices, which drastically reduces the number of subscribers included in a single cell.

With the introduction of the micro cell, maintaining the existing CMTS may be inefficient. The existing CMTS IS designed in consideration of the transmission of services to several hundred to several thousand subscriber devices, such that it is very complicated and expensive.

There is a need for a transmission apparatus and a transmission method for a subscriber network keeping pace with the development of IPs of the digital cable broadcasting services and the micro cell of the HFC network.

SUMMARY OF THE INVENTION

The present invention provides a transmission apparatus and a transmission method for a subscriber network using a single transmission structure using IP packets without dividing broadcasting services and communication services, and a transmission system using the same.

In an aspect, a transmission apparatus for a subscriber network in a cable network is provided. The apparatus includes a passive optical network (PON) receiver for receiving data packets through a fiber line from a head end using a plurality of optical wavelengths, and a micro cable modem termination system (CMTS) for converting the data packets into a data over cable service interface specification (DOCSIS)-based DOCSIS frame and for transmitting the DOCSIS frame to at least one subscriber device through a coaxial line.

The micro CMTS may divide at least one subscriber device for each service group and divide the data packets for each service group according to an optical wavelength.

The micro CMTS may provide the data packets to the corresponding service group according to the optical wavelength.

The data packets may be internet protocol (IP) packets.

The data packets may include IP packets for broadcasting services and IP packets for communication services.

The PON receiver may be operated based on a gigabit passive optical network (GPON).

The head end may include the PON transmitter for transmitting the data packets through the fiber line.

In another aspect, a transmission method for a subscriber network in a cable network is provided. The method includes receiving data packets from a head end through a fiber line using a plurality of optical wavelengths, converting the data packets into a data over cable service interface specification (DOCSIS)-based DOCSIS frame, and transmitting the DOCSIS frame to at least one subscriber device through a coaxial line.

In still another aspect, a transmission system for a cable network includes a head end including a passive optical network (PON) transmitter for transmitting data packets through an fiber line using a plurality of optical wavelengths, a PON receiver for receiving the data packets from the head end through the fiber line, and a micro cable modem termination system (CMTS) for converting the data packets into a data over cable service interface specification (DOCSIS)-based DOCSIS frame and transmitting the DOCSIS frame to a subscriber network through a coaxial line.

DESCRIPTION OF EXEMPLARY EMBODIMENTS

Figure 1:
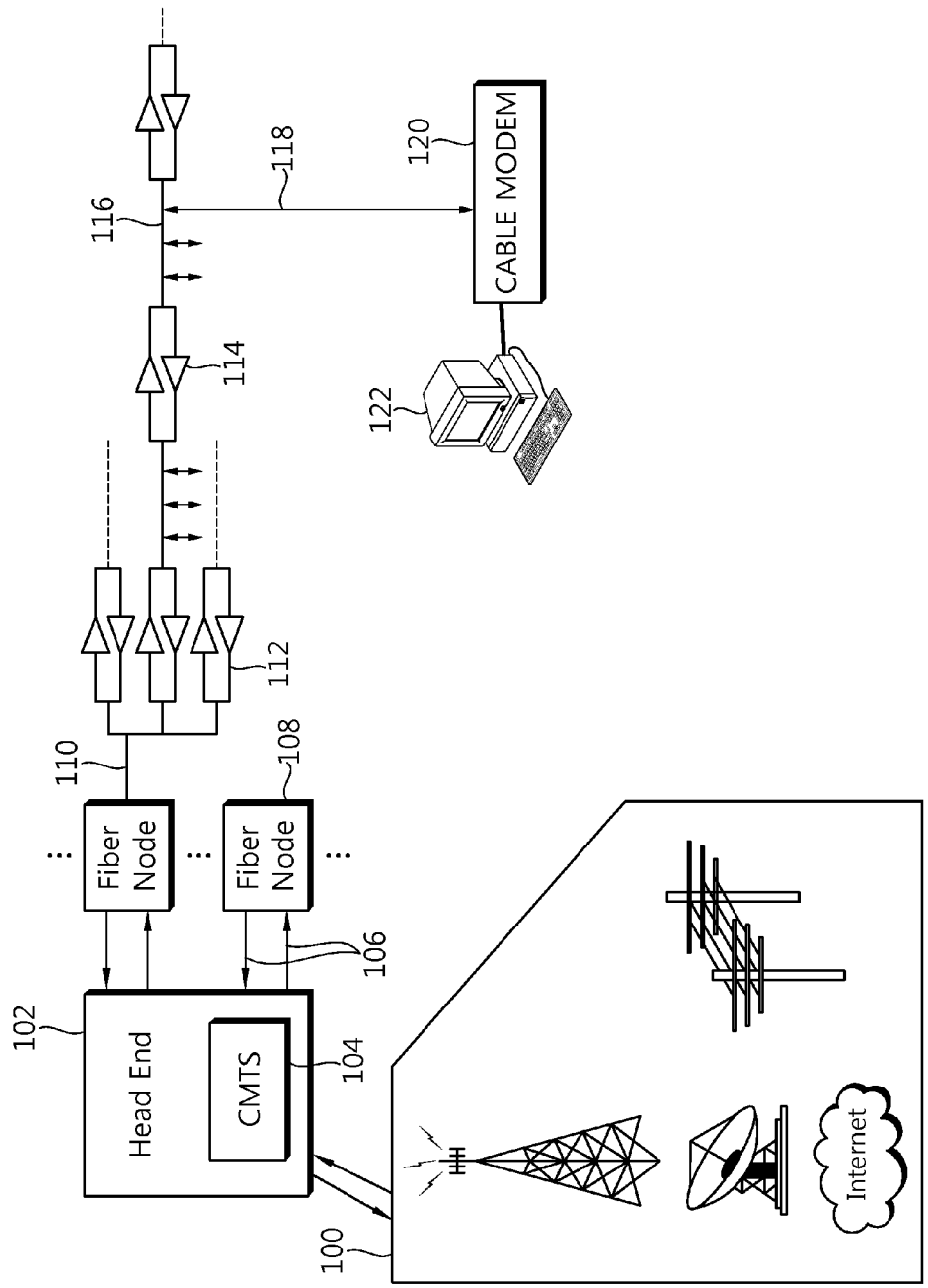
FIG. 1 is a block diagram showing a conventional hybrid fiber-coaxial (HFC) cable network system.

FIG. 1 is a block diagram showing a conventional hybrid fiber-coaxial (HFC) cable network system.

The head end 102 includes a cable modem termination system (CMTS) 104. The CMTS 104 receives signals from an external source 100 and converts the signals into RF signals to be transmitted through a cable network. The CMTS 104 provides a medium access control (MAC) layer for streams received and transmitted to and from the cable network. The CMTS 104 performs modulation and demodulation on the streams received and transmitted to and from the cable network.

The head end 102 is connected to a fiber node 108 through a fiber line 106. Each fiber node 108 is connected to an amplifier 112 through a coaxial cable 110. The amplifier 112 is connected to a distribution amplifier 114 through a trunk line. The fiber node 108, the coaxial cable 110, the amplifier 112, the distribution amplifier 114, and a branch line 118 configure a distribution system of the HFC network. The branch line 118 is connected to the cable modem 120. The cable modem 120 is connected to a subscriber terminal 122.

The cable modem 120 and/or the subscriber terminal 122 are a subscriber device.

As described above, in the HFC network, the digital broadcasting services and the communication services have been provided through separate channels by using separate equipment. The digital broadcasting services are modulated into RF signals in a quadrature amplitude modulation (QAM) scheme by using a moving picture expert group 2-transport stream (MPEG2-TS)-based broadcasting stream and are then transmitted by using a broadcasting frequency. The communication services are provided by using a DOCSIS protocol between a CMTS positioned at a head end and subscriber devices.

Recently, the boundaries between the broadcasting services and the communication services are gradually becoming indistinct. Further, the digital broadcasting services using the HFC network will gradually be developed from a type using the existing MPEG-2 TS to a type using Internet Protocol packets.

The present invention provides a transmission apparatus and a transmission method for an Internet Protocol (IP)-based subscriber network, without individually deploying an apparatus for broadcasting services and an apparatus for communication services in the hybrid fiber-coaxial (HFC) network.

In the HFC network, a set of subscriber devices receiving the same transmission signals will now be referred to as a cell. The cells configure a subscriber network. For example, a micro cell may be a cell including subscriber devices of 100 or less. A macro cell is a cell capable of providing services to a larger number of subscribers than the micro cell.

Figure 2:
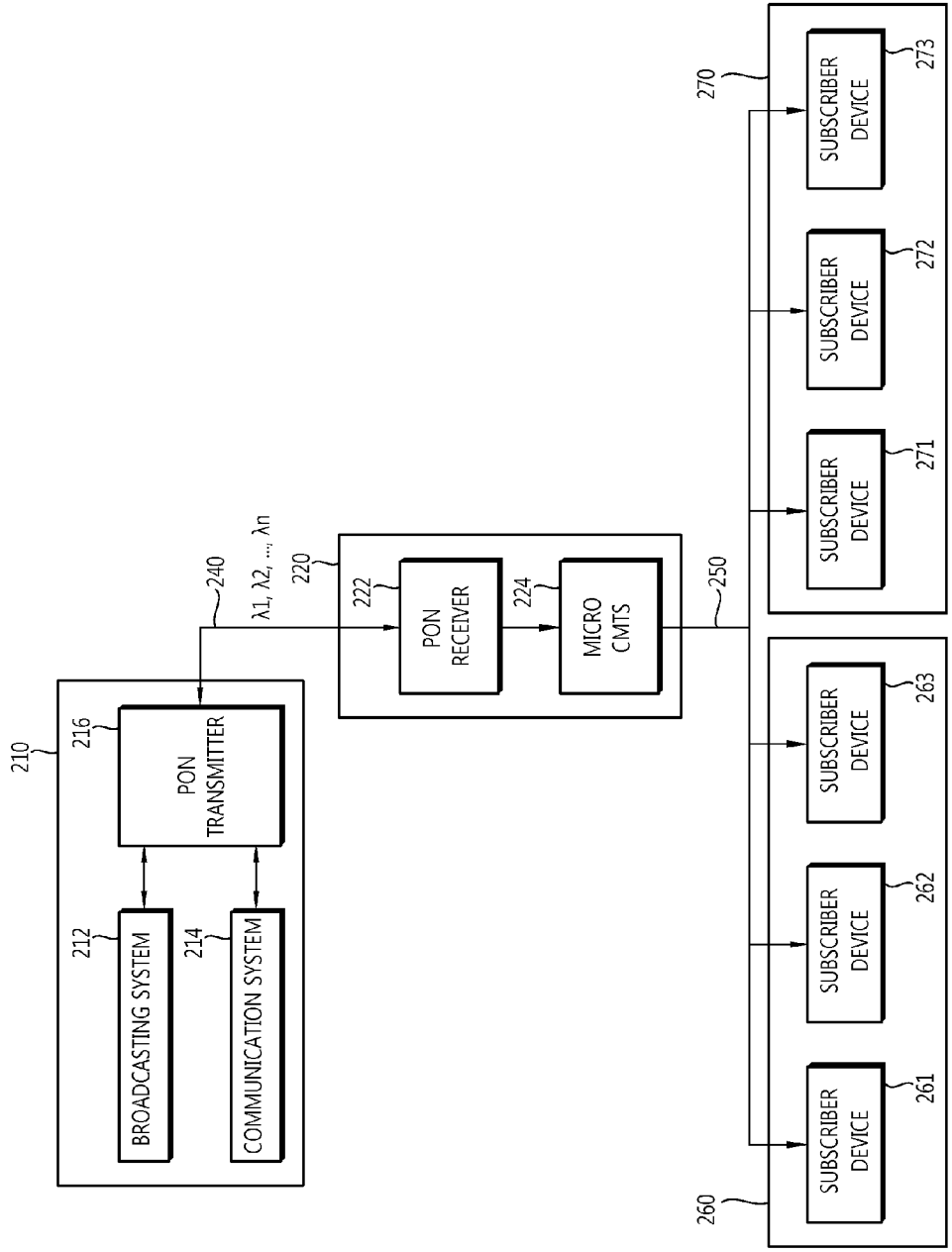
FIG. 2 is a block diagram of a transmission system for a subscriber network according to an exemplary embodiment of the present invention.

FIG. 2 is a block diagram of a transmission system for a subscriber network according to an exemplary embodiment of the present invention.

A head end 210 is configured to include a broadcasting system 212 providing IP-based broadcasting services, a communication system 214 providing IP-based communication services, and a passive optical network (PON) transmitter 216.

The broadcasting system 212 transmits IP packets for broadcasting services to the PON transmitter 216 and the communication system 214 transmits the IP packets for communication services to the PON transmitter 216. Hereinafter, the IP packets for broadcasting services and/or the IP packets for communication services are referred to as data packets.

The PON transmitter 216 transmits the data packets to a transmission apparatus 220 through a fiber line 240. The PON transmitter 216 may transmit the data packets through the fiber line 240 using a plurality of optical wavelengths $\lambda 1, \lambda 2, \ldots, \lambda n$. The data packets may be transmitted by dividing optical wavelengths for each service group to which each subscriber device belongs.

The transmission apparatus 220 is configured to include a PON receiver 222 and a micro CMTS 224. The PON receiver 222 receives the data packets through the fiber line 240.

The micro CMTS 224 may classify the data packets for each service group. The micro CMTS 224 may classify the data packets received for each optical wavelength into each service group.

The micro CMTS 224 converts the data packets into a data over cable service interface specification (DOCSIS)-based DOCSIS frame for each service group.

The micro CMTS 224 transmits the DOCSIS frame to micro cells 260 and 270 belonging to each service classification through a coaxial line 250. The first micro cell 260 belongs to a first service group and the second micro cell 270 belongs to a second service group. When the services are provided by grouping subscriber devices for different service groups, they may be provided at a higher data rate for each subscriber device.

The first micro cell 260 and the second micro cell 270 may each include three subscriber devices 261, 262, 263, 271, 272, and 273, but are not limited thereto. The micro cells 260 and 270 may include several tens of subscriber devices.

The PON transmitter 216 and the PON receiver 222 may be operated based on a gigabit passive optical network (GPON).

The micro CMTS 224 is different from the existing CMTS in that it simultaneously receives the IP packets for broadcasting services and the IP packets for communication services through the fiber line. The existing CMTS does not process the broadcasting IP packets according to an MPEG2-TS standard but processes only the IP packets for communication services.

In addition, the micro CMTS 224 is different from the existing CMTS in that it receives the data packets through the fiber line and transmits the DOCSIS frame to the subscriber network through the coaxial line. The existing CMTS receives the IP packets for communication services through the IP network and transmits the DOCSIS frame to the subscriber network through the fiber line.

The CMTS up to the conventional DOCSIS 2.0 transmits/receives data to and from all the subscriber devices in a single cell through the same downstream channel and upstream channel. However, the subscriber devices supporting a DOCSIS 3.0 standard divides the service group for each subscriber device and divides the upstream/downstream channels for each service group, thereby making it possible to transmit/receive data. In the present invention, the head end divides and transmits the data packets transmitted to the subscriber devices for each optical wavelength. Further, the transmission apparatus provides a function of dividing the service groups of the subscriber devices for each optical wavelength. By using these functions, the service groups to which the subscriber devices belong are more subdivided, thereby making it possible to drastically increase the transmission rate per subscriber.

The structure of the existing CMTS positioned at the head end and providing communication services to several hundred to several thousand subscriber devices has a very complicated structure and requires a very high processing rate. Therefore, it is very difficult to implement the CMTS, which is very expensive equipment. However, the above-mentioned micro CMTS provides the services to relatively few subscriber devices positioned in the micro cells, such that it needs only the minimum functions. The CMTS may be easily implemented as a very simple structure and the network may be implemented at lower costs.

The subscriber devices 261, 262, and 263 in the micro cell 260 receive the IP-based broadcasting packets and communication packets through the micro CMTS 224, thereby allowing to efficiently use the broadcasting services and the communication services through the same transmission structure.

Figure 3:
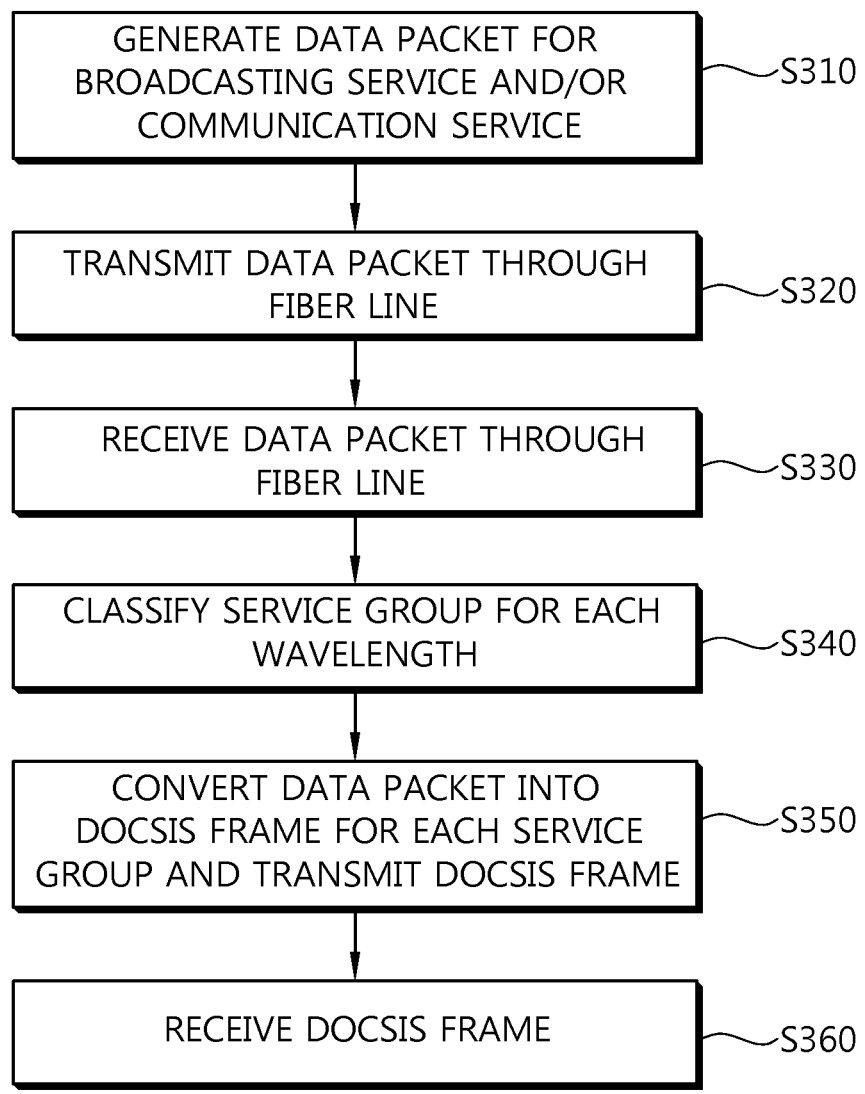
FIG. 3 is a flow chart showing a transmission method for a subscriber network according to an exemplary embodiment of the present invention.

FIG. 3 is a flow chart showing a transmission method for a subscriber network according to an exemplary embodiment of the present invention.

The data packets, which are the IP packets for broadcasting services and/or communication services, are generated (S310). The broadcasting system in the head end generates the IP packets for providing the broadcasting services and the communication system may generate the IP packets for providing the communication services.

The PON transmitter in the head end transmits the data packets by different optical wavelengths for each service through the fiber line (S320).

The PON receiver receives the data packets for each of the plurality of optical wavelengths through the fiber line (S330).

The micro-CMTS classifies the subscriber devices for each service group (S340). The micro-CMTS classifies the data packets received for each optical wavelength into the corresponding service group.

The micro-CMTS converts the data packets for each service group into the DOCSIS-based DOCSIS frame and transmits the DOCSIS frame to at least one subscriber to device for each service group through the coaxial line (S350).

The subscriber device receives the DOCSIS frame through the coaxial line (S360). Therefore, the subscriber device may provide the broadcasting services and/or the communication services to the subscriber.

As set forth above, the exemplary embodiment of the present invention provides the same transmission structure for broadcasting services and communication services, thereby making it possible to more simply configure the head end than that of the existing cable network. Further, the transmission apparatus for a subscriber network can efficiently provide services to the micro cells of the HFC network.

The sub-divided micro cell services can be provided and the higher transmission rate can be provided, by dividing the service group for the subscriber device in the HFC network.

A higher service of quality may be provided at lower cost and the transmission bandwidth may be allocated more efficiently, by replacing a very expensive existing CMTS with the micro CMTS.

As set forth above, the exemplary embodiment of the present invention provides the same transmission structure for broadcasting services and communication services, thereby making it possible to simply configure the head end of the cable network.

Further, the exemplary embodiment of the present invention can efficiently provide services to the micro cells of the HFC network.

In addition, the exemplary embodiment of the present invention can provide a higher service of quality at lower cost and can allocate the larger transmission bandwidth per subscriber.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A transmission apparatus for a subscriber network in a cable network, the transmission apparatus being connectable to a head end of the cable network via a fiber line, comprising:
   a passive optical network (PON) receiver configured to receive data packets through the fiber line from the head end, the data packets being transmitted via the fiber line using a plurality of optical wavelengths; and
   a micro cable modem termination system (CMTS) configured to classify the received data packets based on the plurality of optical wavelengths for a plurality of service groups, ones of the data packets for each service group having a same optical wavelength, to convert the ones of the data packets for each service group into a frame in accordance with a data over cable service interface specification (DOCSIS), and to transmit the DOCSIS frame to at least one subscriber device through a coaxial line.

2. The transmission apparatus of claim 1, wherein the data packets are internet protocol (IP) packets.

3. The transmission apparatus of claim 2, wherein the data packets include IP packets for broadcasting services and IP packets for communication services.

4. The transmission apparatus of claim 1, wherein the PON receiver is operated based on a gigabit passive optical network (GPON).

5. The transmission apparatus of claim 1, wherein the head end includes a PON transmitter transmitting the data packets through the fiber line.

6. A transmission system for a cable network, comprising:
   a head end including a passive optical network (PON) transmitter for transmitting data packets through a fiber line using a plurality of optical wavelengths;
   a PON receiver for receiving the data packets from the head end through the fiber line; and
   a micro cable modem termination system (CMTS) for classifying the received data packets based on the plurality of optical wavelengths for a plurality of service groups, ones of the data packets for each service group having a same optical wavelength, converting the ones of the data packets for each service group into a frame in accordance with a data over cable service interface specification (DOCSIS), and transmitting the DOCSIS frame to a subscriber network through a coaxial line.

7. The transmission system of claim 6, wherein the data packets are internet protocol (IP) packets.

8. The transmission system of claim 6, wherein the PON transmitter and the PON receiver are operated based on a gigabit passive optical network (GPON).

* * * * *